United States Patent
Hachiya et al.

(10) Patent No.: US 9,231,510 B2
(45) Date of Patent: Jan. 5, 2016

(54) CONTROL DEVICE FOR ROTARY MACHINE AND INDUCTANCE MEASUREMENT METHOD FOR ROTARY MACHINE

(75) Inventors: Yosuke Hachiya, Tokyo (JP); Tetsuya Kojima, Tokyo (JP); Shoji Adachi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 132 days.

(21) Appl. No.: 14/346,030

(22) PCT Filed: Nov. 29, 2011

(86) PCT No.: PCT/JP2011/077473
§ 371 (c)(1),
(2), (4) Date: Mar. 20, 2014

(87) PCT Pub. No.: WO2013/080292
PCT Pub. Date: Jun. 6, 2013

(65) Prior Publication Data
US 2014/0232314 A1    Aug. 21, 2014

(51) Int. Cl.
*H02P 7/00*    (2006.01)
*H02P 21/00*    (2006.01)
*H02P 21/14*    (2006.01)

(52) U.S. Cl.
CPC .......... *H02P 21/0035* (2013.01); *H02P 21/145* (2013.01)

(58) Field of Classification Search
CPC . H02P 6/002; H02P 21/0035; G01R 19/2513; G01R 27/2611
USPC ................... 318/490, 400.02, 478, 479, 504
See application file for complete search history.

(56) References Cited

U.S. PATENT DOCUMENTS 7,408,322 B2 * 8/2008 Kinpara .................. H02P 23/14
                                                318/400.05
8,120,296 B2 * 2/2012 Maekawa .................. H02P 6/18
                                                318/400.02
(Continued)

FOREIGN PATENT DOCUMENTS

JP           4-359691        12/1992
JP        2000-342000        12/2000
(Continued)

OTHER PUBLICATIONS

International Search Report issued Feb. 14, 2012, in PCT/JP11/077473 filed Nov. 29, 2011.
(Continued)

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A control device for rotary machine includes: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current. The voltage instruction generation section generates voltage instructions of constant DC voltages. The voltage application section applies voltages to the rotary machine based on the voltage instructions. The inductance calculation section calculates the inductance from a voltage instruction for measurement arbitrarily selected from the voltage instructions, and the rotary machine currents detected by the current detection section before and after application of the voltage instruction for measurement.

11 Claims, 10 Drawing Sheets

(56) References Cited

U.S. PATENT DOCUMENTS

| 8,350,507 | B2* | 1/2013 | Ito | H02P 21/14 318/400.01 |
| 8,878,477 | B2* | 11/2014 | Nakano | H02K 11/001 318/400.11 |
| 2007/0290633 | A1 | 12/2007 | Atarashi et al. | |
| 2010/0194319 | A1* | 8/2010 | Ito | H02P 21/14 318/400.13 |

FOREIGN PATENT DOCUMENTS

| JP | 2001-352800 | 12/2001 |
| JP | 2007-325397 | 12/2007 |
| JP | 4271397 | 3/2009 |
| JP | 2009-232573 | 10/2009 |
| TW | 1340532 B | 4/2011 |

(56) References Cited

\* cited by examiner

CONTROL DEVICE FOR ROTARY MACHINE AND INDUCTANCE MEASUREMENT METHOD FOR ROTARY MACHINE

TECHNICAL FIELD

The present invention relates to a rotary machine as an induction machine or a synchronous machine, and particularly, to a control device and an inductance measurement method that are capable of measuring the inductance of a rotary machine.

BACKGROUND ART

A control device for drive-controlling a rotary machine needs the value of an electric constant (resistance or inductance) of the rotary machine.

In conventional measurement of an inductance constant of a rotary machine, AC power is applied with a rotor of the rotary machine fixed by a restraining tool, to measure the inductance constant. However, in a rotary machine connected to some machine, there is such a problem that the connected machine is damaged when the rotary machine rotates upon electric constant measurement. Therefore, a control device for rotary machine and an electric constant measurement method that are capable of measuring an electric constant with no rotation, are required.

As constant measurement device and method for rotary machine with no rotation, the following method is proposed. That is, respective voltage instructions when two levels of large and small DC currents are flown to a current control section are stored, a voltage value based on the larger one of the two levels of DC currents is sharply changed to a voltage value based on the smaller one, a time taken until the current change at this time reaches a predetermined value of the current step width between two levels is measured, and the measured time is divided by a measured value of a winding resistance, thereby calculating a d-axis inductance (for example, see Patent Document 1).

In addition, the following control method and device are proposed. That is, a q-axis current instruction and a d-axis current instruction are set at a first q-axis current instruction value and a first d-axis current instruction value, a d-axis current step instruction having a predetermined height is given to the control device, voltage corresponding to voltage drop due to a primary resistance of an electric motor is subtracted from a d-axis voltage instruction value generated in response to a deviation of a d-axis current detection value with respect to the step instruction, the voltage value obtained by the subtraction is integrated over a predetermined first integral time to generate a d-axis integral value, a d-axis change amount of a d-axis current detection value at the integral end point with respect to the d-axis current detection value at the integral start point is generated, similar calculation is performed for q-axis to generate a q-axis integral value and a q-axis change amount, an inductance ratio K is defined as K=(q-axis integral value/d-axis integral value)×(d-axis change amount/q-axis change amount), and a q-axis inductance is calculated by expression Lq=K×Ld (for example, see Patent Document 2).

In addition, the following control device and method are proposed. That is, voltage for causing DC excitation is applied to an induction electric motor, the induction electric motor is maintained in a stopped state, a signal for slightly changing secondary magnetic flux due to the DC excitation by using a sine wave, a triangle wave, or a saw-tooth wave having a low frequency is superimposed onto a voltage instruction or a current instruction, and a mutual inductance is calculated based on a current detection value and a voltage instruction or a voltage detection value (for example, see Patent Document 3).

CITATION LIST

Patent Document

Patent Document 1: Japanese Laid-Open Patent Publication No. 2009-232573 (paragraph [0007] and FIG. 2)

Patent Document 2: Japanese Laid-Open Patent Publication No. 2001-352800 (paragraph [0015])

Patent Document 3: Japanese Laid-Open Patent Publication No. 2000-342000 (paragraphs [0004] and [0013])

SUMMARY OF THE INVENTION

Problems to be Solved by the Invention

In the constant measurement method of Patent Document 1, it is necessary to sharply change the applied voltage value and measure a time taken until the current at this time changes to a specific value, and therefore there is a problem that a computing device such as an A/D converter or a microcomputer capable of sampling that is sufficiently fast to always monitor the current, is needed.

In addition, in the method and device that calculate the inductance by using an inductance ratio in Patent Document 2, since the q-axis inductance is calculated by Lq=K×Ld, the inductance ratio and the d-axis inductance are needed, and therefore the method and device cannot be applied to a rotary machine in which the inductance ratio changes depending on magnetic saturation of inductance.

In addition, in the inductance calculation device and method using AC current in Patent Document 3, it is necessary to continuously flow at least AC current to a rotary machine over several cycles, and therefore there is a problem that a rotary machine slightly vibrates to cause noise during the measurement period. Further, in order to measure the magnetic saturation characteristic of inductance, it is necessary to increase the amplitude of AC current, and this causes further large vibration and noise.

In order to solve the above problems, the present invention has an object to provide a control device and inductance measurement method for rotary machine, in which an A/D converter or a microcomputer with high performance for detecting change in the rotary machine current upon step voltage application with a high sampling frequency is not needed, a period during which current flows to the rotary machine in constant measurement is shortened as much as possible to suppress vibration and noise of the rotary machine, and further, the magnetic saturation characteristic of inductance can be measured.

Solution to the Problems

A control device for rotary machine according to the present invention includes: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current, wherein the voltage instruction generation section generates a plurality of voltage instructions of constant DC voltages, the voltage application section applies voltages to the rotary machine based on the voltage instructions, and the inductance calculation section calculates the inductance from a voltage instruction for measurement arbitrarily selected from the voltage instructions, and the rotary machine currents detected by the current detection section before and after application of the voltage instruction for measurement.

An inductance measurement method for rotary machine according to the present invention uses a control device for rotary machine including: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current, and the inductance measurement method for rotary machine includes: a step of the voltage instruction generation section generating a plurality of voltage instructions of constant DC voltages; a step of the voltage application section applying voltages to the rotary machine based on the voltage instructions; a step of the current detection section detecting the rotary machine current; and a step of the inductance calculation section calculating the inductance from a voltage instruction for measurement arbitrarily selected from the voltage instructions, and the rotary machine currents detected by the current detection section before and after application of the voltage instruction for measurement.

Effect of the Invention

The control device for rotary machine according to the present invention includes: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current, wherein the voltage instruction generation section generates a plurality of voltage instructions of constant DC voltages, the voltage application section applies voltages to the rotary machine based on the voltage instructions, and the inductance calculation section calculates the inductance from a voltage instruction for measurement arbitrarily selected from the voltage instructions, and the rotary machine currents detected by the current detection section before and after application of the voltage instruction for measurement. Therefore, it becomes possible to provide a control device for rotary machine in which an A/D converter or a microcomputer with high performance is not needed, a period during which current is flown to the rotary machine can be shortened so that vibration and noise of the rotary machine can be suppressed, and the magnetic saturation characteristic of inductance can be measured.

The inductance measurement method for rotary machine according to the present invention uses a control device for rotary machine including: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current, and the inductance measurement method for rotary machine includes: a step of the voltage instruction generation section generating a plurality of voltage instructions of constant DC voltages; a step of the voltage application section applying voltages to the rotary machine based on the voltage instructions; a step of the current detection section detecting the rotary machine current; and a step of the inductance calculation section calculating the inductance from a voltage instruction for measurement arbitrarily selected from the voltage instructions, and the rotary machine currents detected by the current detection section before and after application of the voltage instruction for measurement. Therefore, it becomes possible to provide an inductance measurement method for rotary machine in which an A/D converter or a microcomputer with high performance is not needed, a period during which current is flown to the rotary machine can be shortened so that vibration and noise of the rotary machine can be suppressed, and the magnetic saturation characteristic of inductance can be measured.

DESCRIPTION OF EMBODIMENTS

Embodiment 1

Hereinafter, embodiment 1 of the present invention will be described based on the drawings.

Figure 1:
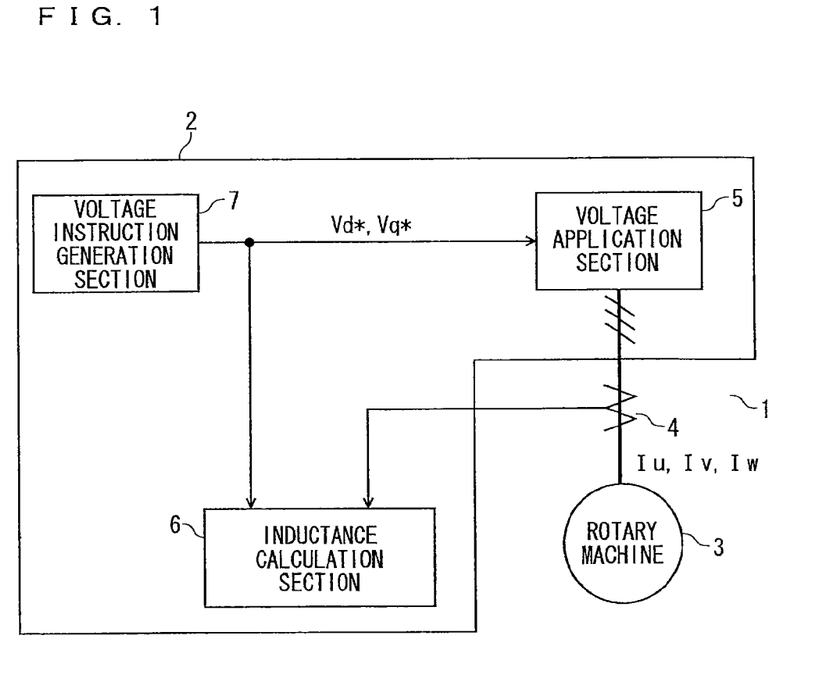
FIG. 1 is a system configuration diagram according to a control device for rotary machine of embodiment 1 of the present invention.
Figure 2:
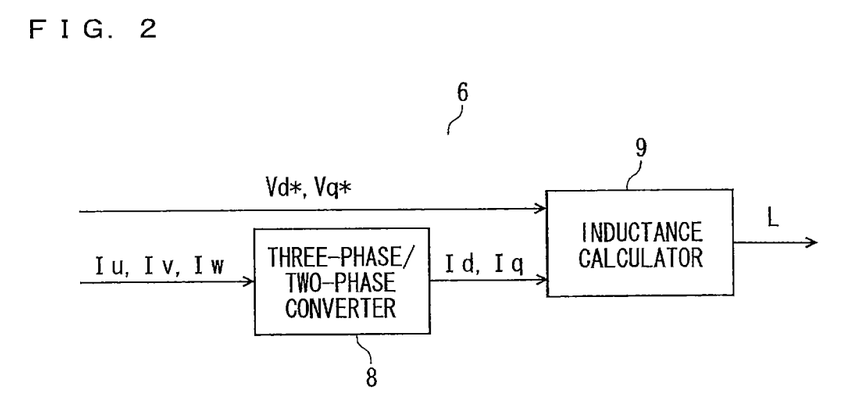
FIG. 2 is a configuration diagram of an inductance calculation section according to the control device for rotary machine of embodiment 1 of the present invention.
Figure 3:
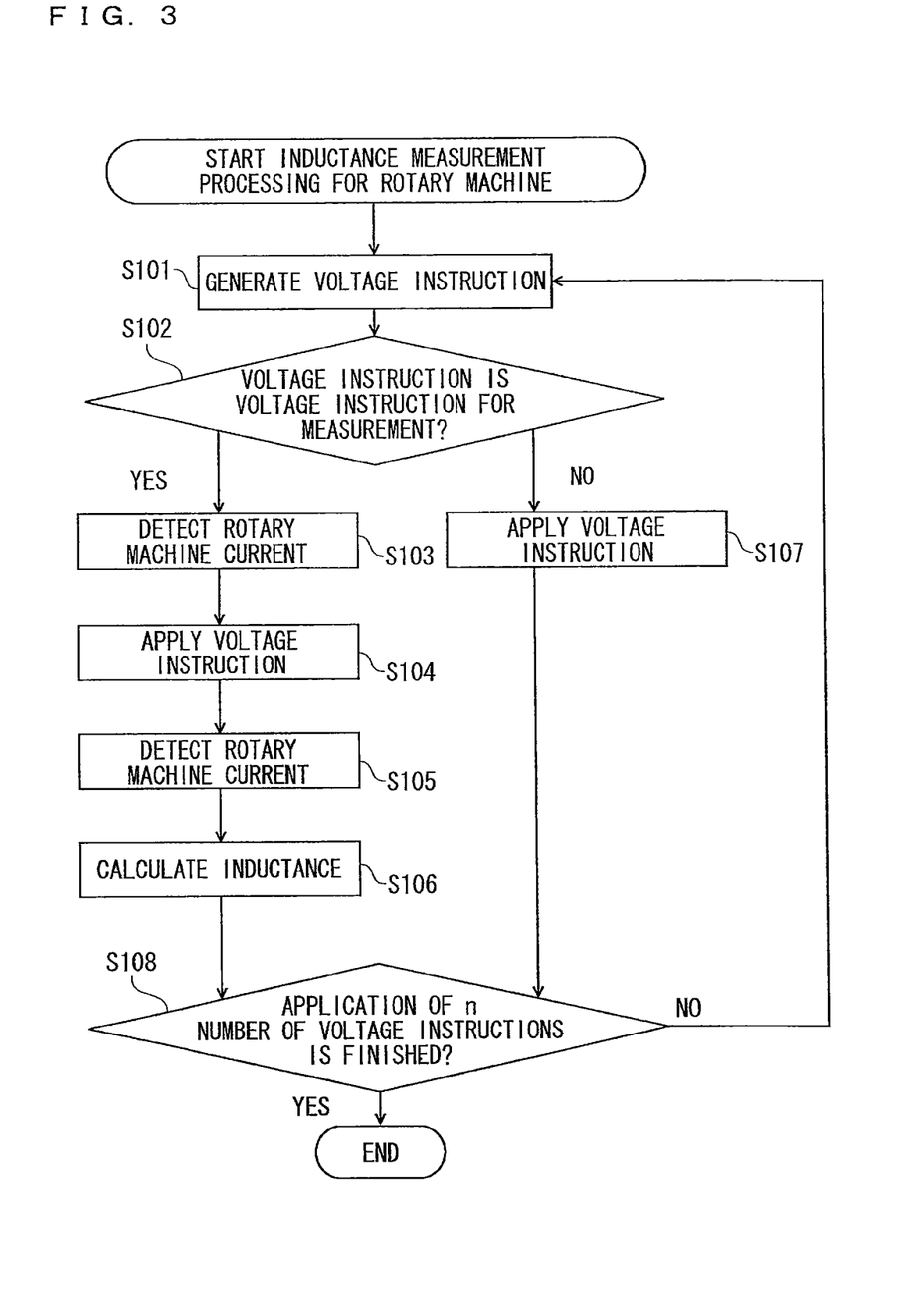
FIG. 3 is a diagram of an inductance measurement processing procedure according to the control device for rotary machine of embodiment 1 of the present invention.
Figure 4:
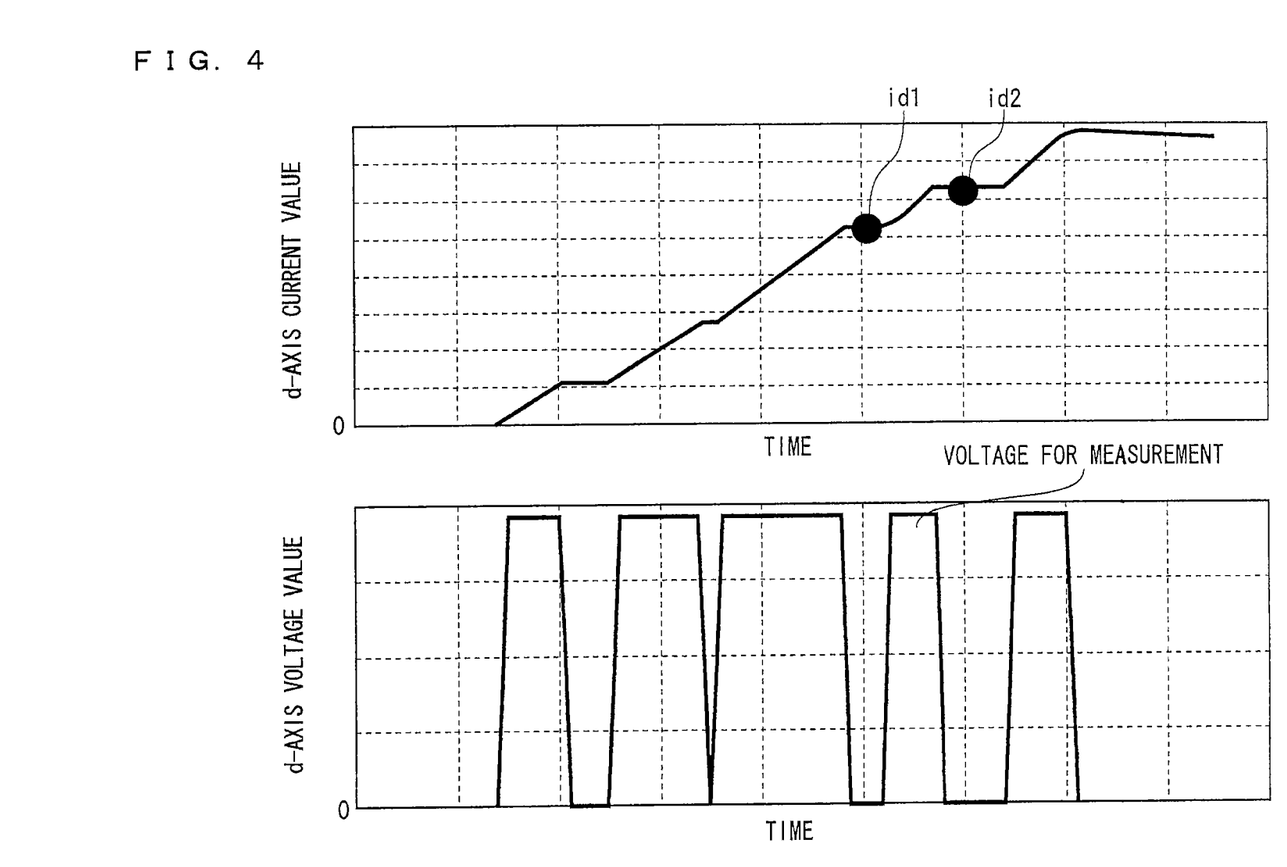
FIG. 4 is a diagram showing an inductance measurement operation example according to the control device for rotary machine of embodiment 1 of the present invention.
Figure 5:
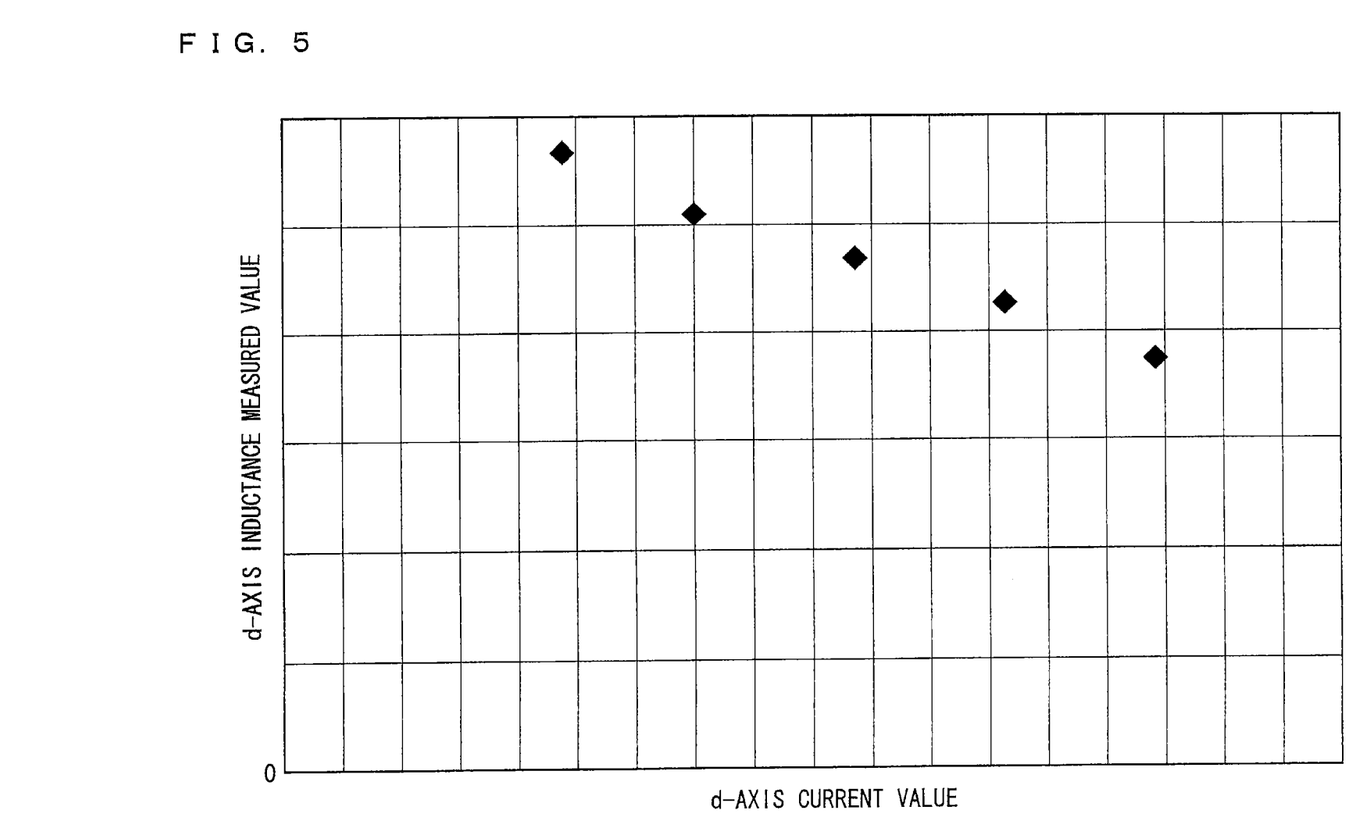
FIG. 5 is a diagram showing a measurement result of the magnetic saturation characteristic of inductance according to the control device for rotary machine of embodiment 1 of the present invention.

FIG. 1 is a configuration diagram of a rotary machine control system 1 to which a control device 2 for rotary machine according to embodiment 1 of the present invention is applied. FIG. 2 is a configuration diagram of an inductance calculation section 6. FIG. 3 is an inductance measurement processing procedure diagram. FIG. 4 is a diagram showing an inductance measurement operation example. FIG. 5 is a diagram showing a measurement result of the magnetic saturation characteristic of inductance.

Hereinafter, the configuration and function of the control device 2 for rotary machine according to embodiment 1 of the present invention will be mainly described, and next, a specific measurement method for inductance according to the present invention will be described.

The configuration and function of the control device 2 for rotary machine according to embodiment 1 of the present invention will be described based on FIGS. 1 to 5.

In FIG. 1, the rotary machine control system 1 to which the control device 2 for rotary machine is applied includes the control device 2 for rotary machine, a rotary machine 3, and a current detection section 4 for detecting the current of the rotary machine 3.

The rotary machine 3 is a synchronous machine. In embodiment 1, a synchronous machine using a permanent magnet will be described as an example.

The control device 2 for rotary machine includes a voltage application section 5 which corresponds to a power converter such as an inverter for applying control voltage to the rotary machine 3, an inductance calculation section 6 for calculating the inductance of the rotary machine 3, and a voltage instruction generation section 7 for generating voltage instructions for driving the rotary machine 3 and for inductance measurement.

The current detection section 4 detects three-phase currents Iu, Iv, and Iw of the rotary machine 3. In embodiment 1, the case where the current detection section 4 detects all of the three-phase currents will be described. However, two phases of the currents may be detected and then the three-phase currents may be calculated considering that the sum of the three-phase currents is zero. Alternatively, the three-phase currents may be calculated from inverter bus current or current flowing in a switching device, and the state of the switching device.

The voltage application section 5 generates voltage instructions (Vu*, Vv*, Vw*) based on voltage instructions (Vd*, Vq*) from the voltage instruction generation section 7, and applies voltage to the rotary machine 3 based on the generated voltage instructions.

The voltage instructions generated by the voltage instruction generation section 7 are voltage instructions Vd* and Vq* in a rotational two-axis coordinate system (hereinafter, referred to as d-q axes). Based on the voltage instructions generated by the voltage instruction generation section 7, the voltage application section 5 generates three-phase voltage instructions (Vu*, Vv*, Vw*) by expression (1), and applies voltage to the rotary machine 3 based on the generated voltage instructions. It is noted that a rotor position θ of the rotary machine 3 is needed to specify the d-q axes. In the case where the rotary machine 3 has a magnetic pole position detector, a detection value from the magnetic pole position detector may be used for θ. In the case where the rotary machine 3 does not have a position detector, a detection method for initial magnetic pole as shown in Patent Document [Japanese Patent No. 4271397] may be used.

$$\begin{pmatrix} Vu^* \\ Vv^* \\ Vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos\theta & -\sin\theta \\ \sin\theta & \cos\theta \end{pmatrix} \begin{pmatrix} Vd^* \\ Vq^* \end{pmatrix} \quad (1)$$

FIG. 2 shows a configuration diagram of the inductance calculation section 6. The inductance calculation section 6 receives the voltage instructions Vd* and Vq* from the voltage instruction generation section 7 and detection values Iu, Iv, and Iw of three-phase currents from the current detection section 4. A three-phase/two-phase converter 8 converts the three-phase current values (Iu, Iv, Iw) into currents Id and Iq on d-q axes by expression (2).

An inductance calculator 9 calculates an inductance, using the currents Id and Iq and the voltage instructions Vd* and Vq* on d-q axes, based on a later-described calculation method.

[Mathematical 2]

$$\begin{pmatrix} Id \\ Iq \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & \frac{1}{\sqrt{2}} & -\frac{1}{\sqrt{2}} \end{pmatrix} \begin{pmatrix} Iu \\ Iv \\ Iw \end{pmatrix} \quad (2)$$

FIG. 3 shows a measurement processing procedure for the inductance of the synchronous machine 3 according to embodiment 1.

When inductance measurement processing for the rotary machine 3 is started, in step S101, the voltage instruction generation section 7 generates a voltage instruction. Next, in step S102, whether the voltage instruction is a voltage instruction for measurement is determined. If the voltage instruction is a voltage instruction for measurement, in step S103, the current of the rotary machine 3 is detected. Next, in step S104, the voltage application section 5 applies voltage based on the voltage instruction to the rotary machine 3. After the application of the voltage instruction is finished, in step S105, the current of the rotary machine 3 is detected. Next, in step S106, the inductance calculation section 6 calculates the inductance of the rotary machine 3 based on the rotary machine currents detected in steps S103 and S105.

In step S108, whether application of initially set n number of voltage instructions is finished is confirmed. If the application is finished, the inductance measurement processing is ended. If the application is not finished, the process returns to step S101.

In step S102, if the voltage instruction is not a voltage instruction for measurement, the process proceeds to step S107 to perform only application of the voltage instruction without detection of rotary machine current, and then the process proceeds to step S108.

The voltage instruction generation section 7 generates n (n≥2) number of voltage instructions in accordance with the procedure shown in the chart. The value n takes any positive number equal to or greater than 2, and the voltage instruction takes its value in any vector direction on d-q axes. In embodiment 1, voltage is applied in the d-axis direction to measure the inductance of the rotary machine 3.

The inductance calculation section 6 selects any of the generated voltage instructions, as a voltage instruction for measurement of inductance (hereinafter, referred to as a voltage instruction for measurement), and calculates the inductance, using the rotary machine current values detected before and after application of voltage based on the voltage instruction for measurement. The number of voltage instructions for measurement is not limited to one. A plurality of voltage instructions for measurement may be selected from the n number of voltage instructions, and the inductance may be calculated for each selected voltage instruction for measurement.

FIG. 4 shows an example of an inductance measurement operation of the synchronous machine 3 of embodiment 1 at any point of time during application of voltages based on the n number of voltage instructions. In FIG. 4, the upper diagram shows time change in the d-axis current flowing in the rotary machine 3, and the lower diagram shows time change in the d-axis voltage applied to the rotary machine 3. When a voltage instruction for measurement V* is applied at any point of time, the rotary machine current is detected at a point I1 before the application of the voltage for measurement and a point I2 after the application of the voltage for measurement.

Here, V*, I1, and I2 are represented on d-q axes, as described above. In FIG. 4, the d-axis current value corresponding to the point I1 is represented as id1, and the d-axis current value corresponding to the point I2 is represented as id2.

In embodiment 1, since each application is on the d-axis, the respective signs are represented as Id1, Id2, and Vd*.

In FIG. 4, the d-axis current of the rotary machine 3 increases to id1 by a plurality of voltage instructions, and then the d-axis current of the rotary machine 3 increases to id2 by the voltage for measurement applied next. Inductance calculation means calculates the inductance from expressions (12) and (13) described later, using the voltage instruction for measurement Vd* and a current difference Δid=id2−id1. The calculated inductance is an inductance value at the current value of the midpoint (id1+id2)/2 between the currents id1 and id2.

In addition, by changing the voltage instruction value to change the current value of id1, an inductance value at any current value can be measured. In order to measure the magnetic saturation characteristic of inductance, the voltage instruction for measurement may be applied in the state in which the current value of id1 has been increased. In embodiment 1, while the n number of voltages are applied, a plurality of voltages for measurement are applied and the inductance calculation processing for the rotary machine 3 is repeated, whereby inductances at a plurality of current values can be measured.

FIG. 5 shows an example of a current-inductance measurement result in the case where the measurement is repeated while the current value of id1 is changed in embodiment 1. In FIG. 5, it is found that the inductance value decreases as the current value increases, and thus the tendency of magnetic saturation can be observed.

Next, a specific calculation method by the inductance calculation section 6 will be described.

In embodiment 1, the rotary machine 3 is a synchronous machine using a permanent magnet, and the following expressions (3) and (4) are generally obtained as voltage equations on d-q axes.

$$vd = R \times id + PLd \times id - \omega r \times Lq \times iq \qquad (3)$$

$$vq = R \times iq + PLq \times iq + \omega r \times (Ld \times id + \phi f) \qquad (4)$$

Where,
vd: d-axis component of voltage of rotary machine 3
vq: q-axis component of voltage of rotary machine 3
R: winding resistance of rotary machine 3
Ld: d-axis inductance of rotary machine 3
Lq: q-axis inductance of rotary machine 3
φf: rotor magnetic flux amplitude of rotary machine 3
P: differential operator
ωr: rotor angular velocity of rotary machine 3

Further, if a rotor of the rotary machine 3 is in a stopped state before the voltage instructions are generated, the rotor does not rotate immediately after voltage is applied to the rotary machine 3. Therefore, terms containing the angular velocity ω in expressions (3) and (4) can be ignored, so that the following expressions (5) and (6) are obtained.

$$vd = R \times id + PLd \times id \qquad (5)$$

$$vq = R \times iq + PLq \times iq \qquad (6)$$

Here, considering that the inductance has a magnetic saturation characteristic, Ld and Lq can be represented as functions Ld(id) and Lq(iq) which vary depending on the current values, and the second term PLd×id containing a differential operator on the right-hand side of expression (5) is expanded into the following expression (7).

[Mathematical 3]

$$P\{Ld(id) \times id\} = \frac{d}{dt}\{Ld(id) \times id\} \qquad (7)$$
$$= \left[\frac{d}{dt}Ld(id)\right] \times id + Ld(id) \times \frac{did}{dt}$$
$$= \frac{did}{dt}\left\{\left[\frac{d}{did}Ld(id)\right] \times id + Ld(id)\right\}$$

The second term PLq×iq on the right-hand side of expression (6) can also be expanded in the same manner. Then, expressions (5) and (6) are replaced with the following expressions (8) and (9).

$$vd = R \times id + L'd(id) \times (did/dt) \qquad (8)$$

$$vq = R \times iq + L'q(iq) \times (diq/dt) \qquad (9)$$

Where,

[Mathematical 4]

$$L'd(id) = \left[\frac{d}{did}Ld(id)\right] \times id + Ld(id) \qquad (10)$$

[Mathematical 5]

$$L'q(iq) = \left[\frac{d}{diq}Lq(iq)\right] \times iq + Lq(iq) \qquad (11)$$

Expressions for obtaining L'd(id) and L'q(iq) from expressions (8) and (9) are represented by the following expressions (12) and (13).

$$L'd(id) = \int (vd - R \times id) \times (\Delta t/\Delta id) \qquad (12)$$

$$L'q(iq) = \int (vq - R \times iq) \times (\Delta t/\Delta iq) \qquad (13)$$

In expressions (12) and (13), id and iq are the values of currents flowing in the rotary machine 3, and current differences Δid and Δiq between before and after the application of voltage for measurement are current change amounts of the rotary machine currents obtained when a time Δt passes. Since the detection time is short, the inductances can also be calculated by the following expressions (14) and (15), ignoring the winding resistance. However, if the inductances are calculated from expressions (12) and (13) using the winding resistance, the inductances can be calculated with an increased accuracy.

$$L'd(id) = \int vd \times (\Delta t/\Delta id) \qquad (14)$$

$$L'q(iq) = \int vq \times (\Delta t/\Delta iq) \qquad (15)$$

If the detection time for the current value is set so as to allow the current value to be sampled immediately before and after the application of voltage for measurement, error of voltage drop due to the winding resistance can be minimized, whereby the inductance measurement can be performed with high accuracy. Alternatively, as a simple way, the current may be sampled and detected in a control cycle such as a carrier cycle of an inverter device.

L'(i) can be calculated by using the inductance L(i) of the voltage equation as shown in expression (10). Various methods can be employed as an actual calculation method. In order to simplify the calculation performed by the inductance calculation section, L(i) is approximated by a function of current, to represent L(i) by expression of L'(i).

For example, if L(i) is represented by a linear function about current, L(i) can be represented as L(i)=axi+b (a and b are any integers). From expression (10), L'(i) is represented as L'(i)=axi+b+axi=2×axi+b. Therefore, L(i) can be represented by halving a slope a of the linear function of L'(i).

In order to obtain L'(i), the calculation can be performed by an approximate function by a least squares method or the like, using the current-inductance measurement result obtained at a plurality of current points in FIG. 5, for example. As a matter of course, a function expression for approximation is not limited to a linear function, and the calculation can be performed with L(i) set as a quadratic function or a cubic function, as in the above manner.

As described above, the control device 2 for rotary machine of embodiment 1 applies voltages based on a plurality of voltage instructions of constant DC voltages on the d-axis of the rotary machine 3, to increase the current on d-axis to a specific value, and thereafter, applies voltage based on the voltage instruction for measurement on d-axis, to measure the inductance, whereby the inductance at a specific current value can be measured. That is, if the voltage instruction values are changed to change the current flowing in the rotary machine 3, it becomes possible to measure the inductance at large current, so that the magnetic saturation characteristic of inductance of the rotary machine 3 can be measured. In this case, it is sufficient to detect the current values before and after the application of the voltage for measurement, and therefore an A/D converter or a microcomputer capable of high-speed operation for monitoring current change is not needed.

Although in embodiment 1, an example where the rotary machine 3 is a synchronous machine using a permanent magnet has been described, this control device for rotary machine capable of measuring the inductance of the rotary machine is also applicable to an induction electric motor, and a synchronous machine not using a permanent magnet.

As described above, in the control device 2 for rotary machine of embodiment 1, the voltage instruction generation section 7 generates a plurality of voltage instructions of constant DC voltages, the voltage application section 5 applies voltages to the rotary machine 3 based on the voltage instructions, and the inductance calculation section 6 calculates the inductance from a voltage instruction for measurement arbitrarily selected from the voltage instructions, and the rotary machine currents detected by the current detection section before and after the application of the voltage instruction for measurement. Therefore, effects are obtained that an A/D converter or a microcomputer with high performance is not needed, a period during which current flows in the rotary machine 3 can be shortened so that vibration and noise of the rotary machine 3 can be suppressed, and the magnetic saturation characteristic of inductance can be measured.

Further, in the control device 2 for rotary machine of embodiment 1, since the magnetic saturation characteristic is measured, the controllability of the rotary machine 3 can be improved. Thus, an effect is obtained that, for example, if the inductance constant of the rotary machine 3, which is necessary for such a control method as current loop control or sensorless control in rotary machine control, is made to have a magnetic saturation characteristic, rotary machine control with higher accuracy can be performed.

Embodiment 2

Figure 6:
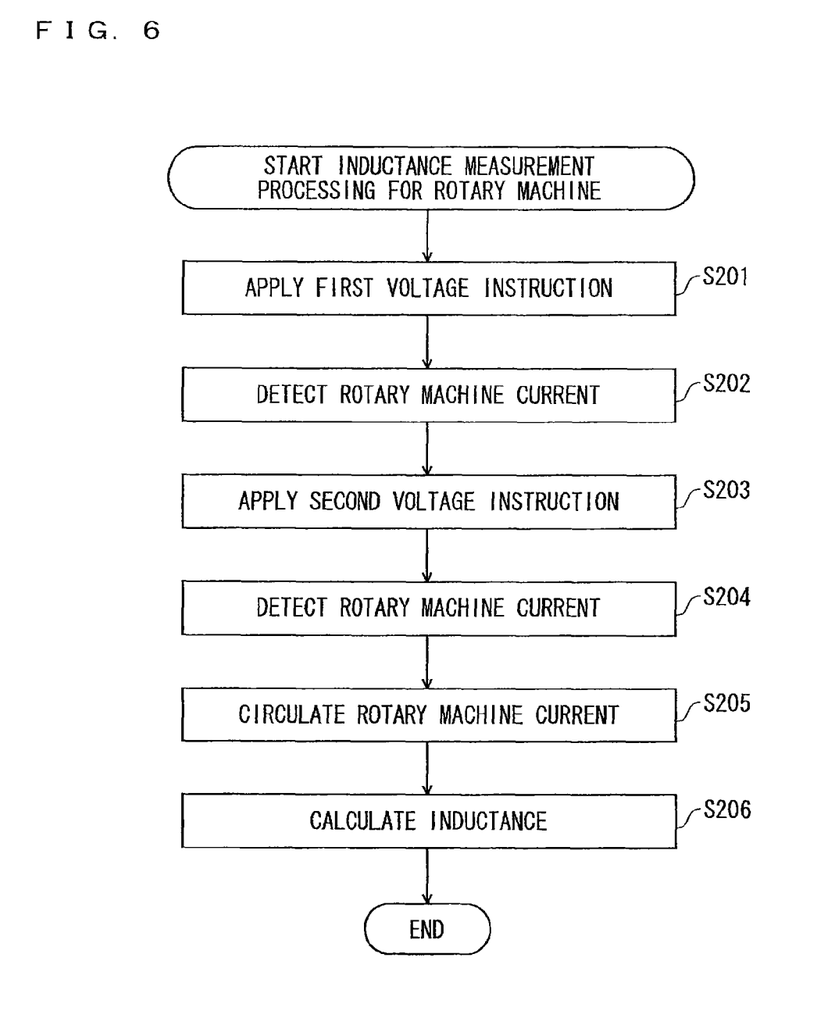
FIG. 6 is a diagram of an inductance measurement processing procedure according to a control device for rotary machine of embodiment 2 of the present invention.
Figure 7:
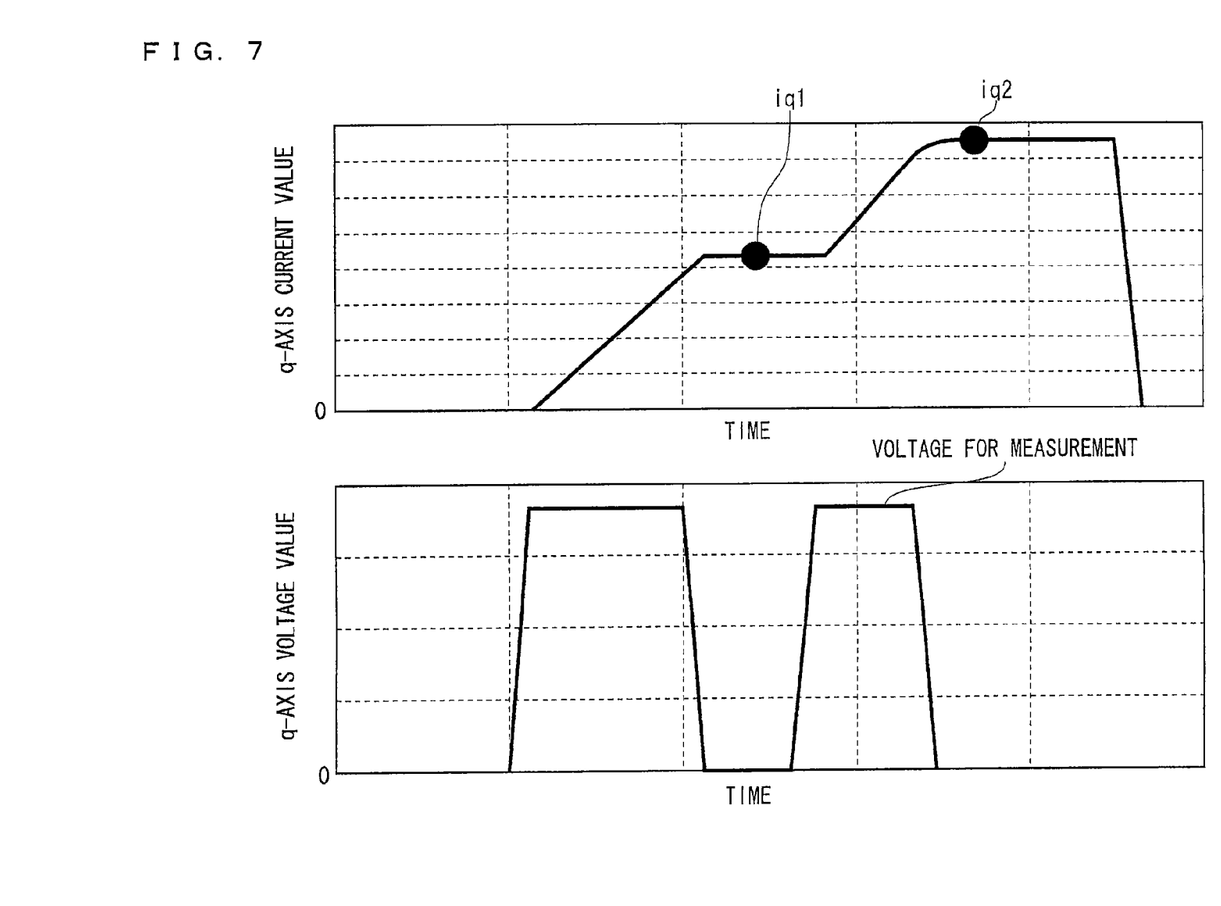
FIG. 7 is a diagram showing an inductance measurement operation example according to the control device for rotary machine of embodiment 2 of the present invention.

Hereinafter, embodiment 2 of the present invention will be described based on the drawings. FIG. 6 is an inductance measurement processing procedure diagram. FIG. 7 is a diagram showing an inductance measurement operation example.

The operation and function of the control device 2 for rotary machine according to embodiment 2 of the present invention will be described based on FIGS. 6 and 7.

The configuration of the control device 2 for rotary machine according to embodiment 2 is the same as in embodiment 1, but the processing by the inductance calculation section 6 and the processing by the voltage instruction generation section 7 are different from those in embodiment 1.

In embodiment 1, the inductance is measured for d-axis on which rotational torque does not occur upon application of voltage. However, generally, the inductances on d-axis and q-axis are needed for controlling the rotary machine 3.

In embodiment 2, voltage is applied on the q-axis of the rotary machine 3, to measure the inductance on q-axis. If voltage is applied on q-axis in a manner described in embodiment 1, current flows on q-axis as torque axis for a long time, and therefore rotational torque is applied to the rotor, so that vibration and noise can occur. Therefore, the number of voltage instructions generated in embodiment 1 is set at n=2, to reduce the voltage application time, thereby suppressing occurrence of vibration and noise for a long time due to rotational torque.

Thus, as compared to embodiment 1, a period during which current flows in the rotary machine 3 can be minimized, occurrence of vibration and noise due to rotational torque can be suppressed to minimum.

FIG. 6 shows a measurement processing procedure for the inductance of the synchronous machine 3 according to embodiment 2.

When the inductance measurement processing for the rotary machine 3 is started, in step S201, the voltage application section 5 applies, to the rotary machine 3, the voltage based on a first voltage instruction for inductance measurement preparation generated by the voltage instruction generation section 7. Next, in step S202, the current of the rotary machine 3 is detected. Next, in step S203, the voltage application section 5 applies voltage based on a second voltage instruction for measurement to the rotary machine 3. Next, in step S204, the current detection section 4 detects the current of the rotary machine 3. Next, in step S205, circulation of current of the rotary machine 3 described later is performed. Next, in step S206, the inductance calculation section 6 calculates the inductance of the rotary machine 3 based on the rotary machine currents detected in steps S202 and S204, and thus the inductance measurement processing is ended.

In embodiment 2, the voltage instruction generation section 7 generates a first voltage instruction vq1 for inductance measurement preparation and a second voltage instruction vq2 for measurement, in the q-axis direction, and then the inductance calculation section 6 calculates the inductance, using vq2 as a voltage instruction for measurement. Further, immediately after the application of voltage for measurement, current flowing in the rotary machine 3 is made to be zero by using means for circulating the current of the rotary machine 3 by gate cutoff of an inverter, for example.

FIG. 7 shows an example of an inductance measurement operation of the synchronous machine 3 according to embodiment 2. In FIG. 7, the upper diagram shows time change in the current flowing in the rotary machine 3, and the lower diagram shows time change in the voltage applied to the rotary machine 3.

In embodiment 2, voltages based on two voltage instructions for inductance measurement preparation and for measurement are applied, and the current value of the rotary machine 3 is made to be zero through current circulation after the application. Since rotational torque of the rotary machine 3 occurs in proportional to the current, a period during which the current flows is minimized to prevent unnecessary torque from being applied to the rotor for a long time, whereby occurrence of vibration and noise is suppressed.

In addition, by changing the instruction value of the voltage instruction vq1, the inductance at any current value can be measured as in embodiment 1. In embodiment 2, by repeating the inductance measurement processing while changing the voltage instruction value of vq1, inductances at a plurality of magnitudes of currents can be measured.

Although in embodiment 2, voltage is applied on q-axis, the axis on which voltage is applied is not limited to q-axis.

As described above, in the control device for rotary machine of embodiment 2, voltages based on two voltage instructions for inductance measurement preparation and for measurement are applied, and the current value of the rotary machine 3 is made to be zero through circulation of current of the rotary machine 3 after the application. Therefore, in addition to the effect of embodiment 1, an effect is obtained that the inductance on q-axis as torque axis can be measured, so that the inductance at any magnitude of current on q-axis can be measured to measure the magnetic saturation characteristic.

Embodiment 3

Figure 8:
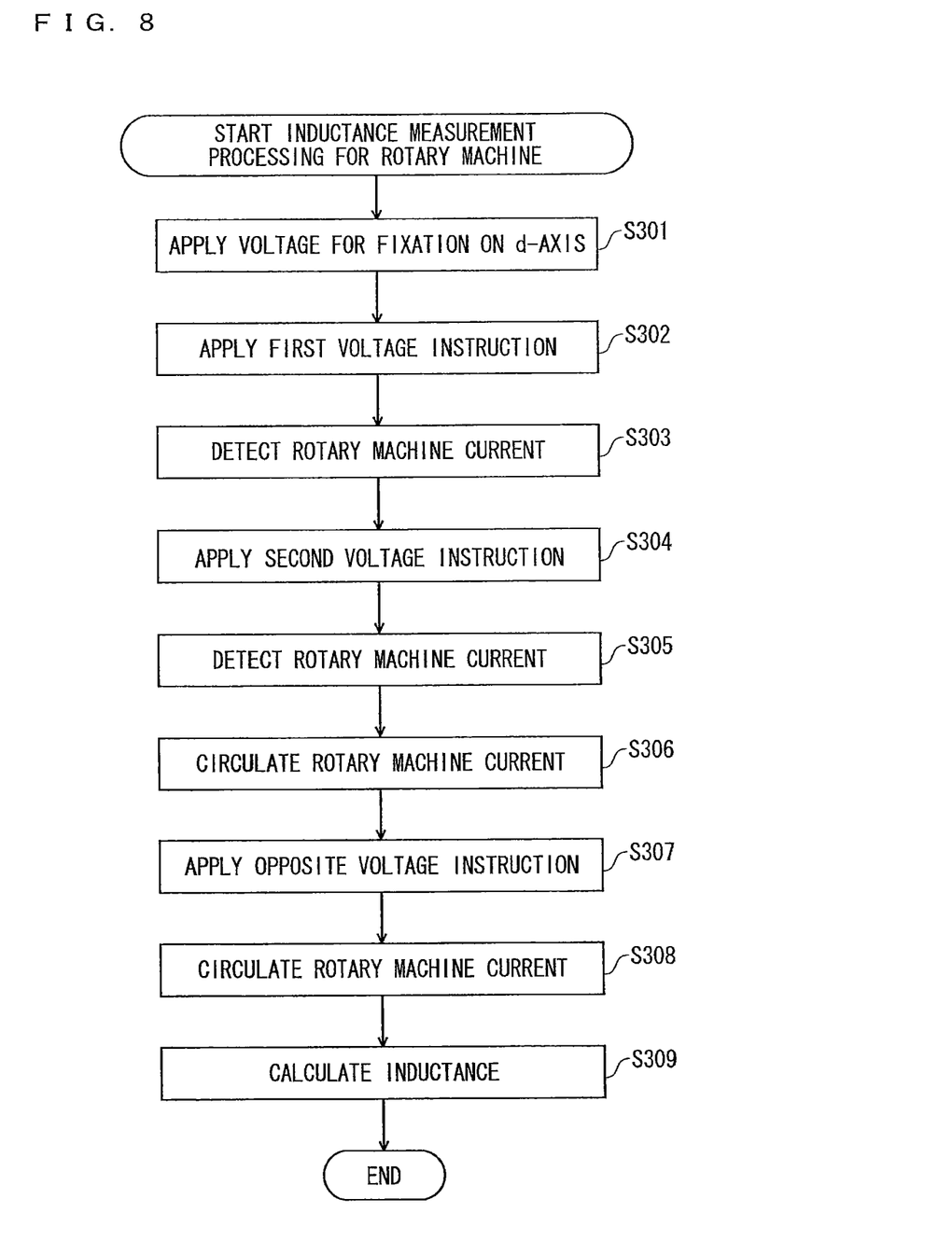
FIG. 8 is a diagram of an inductance measurement processing procedure according to a control device for rotary machine of embodiment 3 of the present invention.
Figure 9:
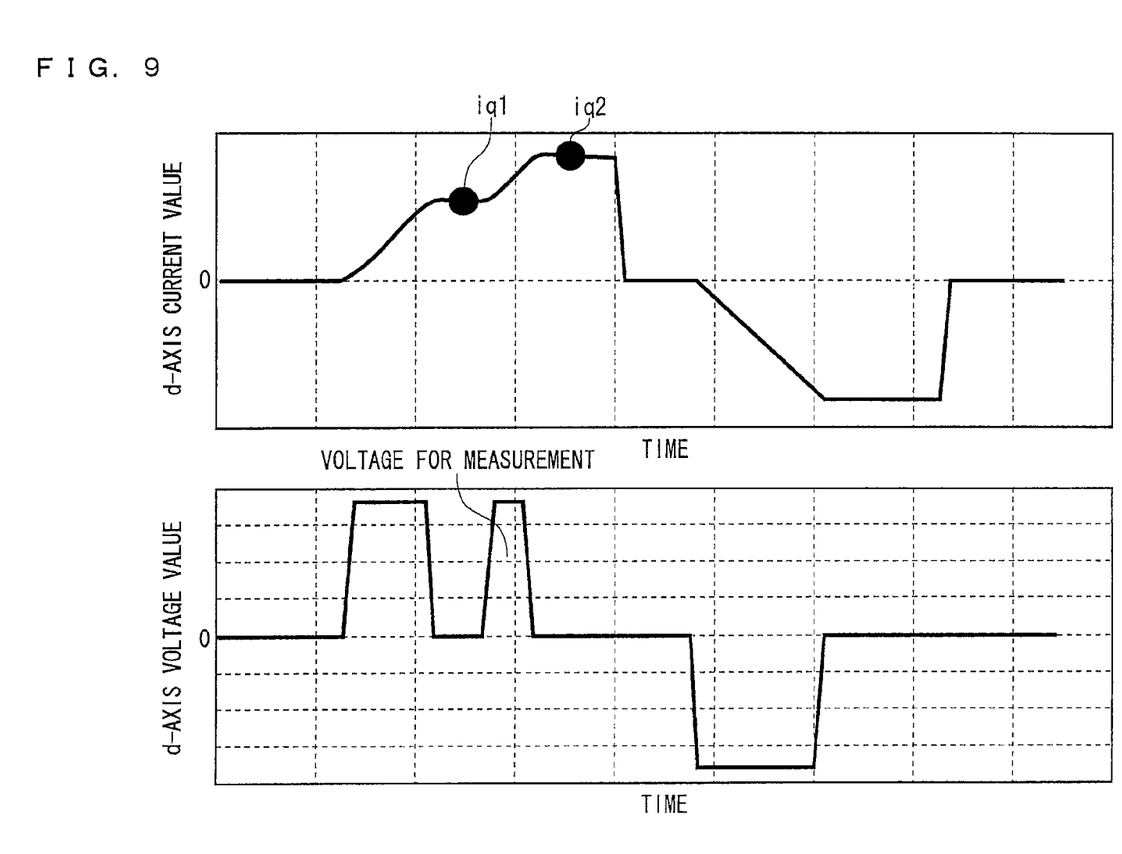
FIG. 9 is a diagram showing an inductance measurement operation example according to the control device for rotary machine of embodiment 3 of the present invention.

Hereinafter, embodiment 3 of the present invention will be described based on the drawings. FIG. 8 is an inductance measurement processing procedure diagram. FIG. 9 is a diagram showing an inductance measurement operation example.

The operation and function of the control device 2 for rotary machine according to embodiment 3 of the present invention will be described based on FIGS. 8 and 9.

The configuration of the control device 2 for rotary machine according to embodiment 3 is the same as in embodiment 1, but the processing by the inductance calculation section 6 and the processing by the voltage instruction generation section 7 are different from those in embodiment 1.

In embodiment 2, although vibration and noise for a long time can be suppressed by making the current of the rotary machine 3 be zero through the current circulation operation, rotation of the rotary machine 3 cannot be prevented, so that the rotor can rotate by inertia. Accordingly, embodiment 3 has, in addition to the configuration of embodiment 2, a configuration that a constant DC voltage instruction on d-axis is superimposed onto the voltage instruction generated by the voltage instruction generation section 7, thereby applying a force for returning to the original axis when the rotor rotates, thus stopping the rotation of the rotary machine 3.

In addition, a vector of voltage instruction is applied in a direction opposite to a vector of voltage instruction generated by the voltage instruction generation section 7, to cancel torque applied to the rotor upon the measurement of inductance, thus suppressing rotation of the rotor.

Thus, as compared to embodiment 2, the inductance can be measured while rotation of the rotary machine 3 is further suppressed.

FIG. 8 shows a measurement processing procedure for the inductance of the synchronous machine 3 according to embodiment 3.

When the inductance measurement processing for the rotary machine 3 is started, in step S301, constant DC voltage is applied on d-axis, whereby the rotor of the rotary machine 3 can be drawn and stopped. This constant DC voltage is applied until the inductance measurement processing is ended, but this application is stopped during circulation of the rotary machine current in steps S306 and S308.

Next, in step S302, the voltage application section 5 applies, to the rotary machine 3, the voltage based on a first voltage instruction for inductance measurement preparation generated by the voltage instruction generation section 7. Next, in step S303, the current detection section 4 detects the current of the rotary machine 3. Next, in step S304, the voltage application section 5 applies voltage based on a second voltage instruction for measurement to the rotary machine 3. Next, in step S305, the current of the rotary machine 3 is detected. Next, in step S306, circulation of current of the rotary machine 3 is performed. Next, in step S307, the voltage application section 5 applies voltage based on a voltage instruction (vq·inv) in the opposite direction, to the rotary machine 3. Next, in step S308, circulation of current of the rotary machine 3 is performed. Next, in step S309, the inductance calculation section 6 calculates the inductance of the rotary machine 3 based on the rotary machine currents detected in steps S303 and S305, and thus the inductance measurement processing is ended.

After the current circulation operation in step S306, equal current in a direction opposite to the current applied to the rotary machine 3 is flown for suppressing rotation of the rotor of the rotary machine 3, in step S307. The voltage instruction vq·inv needed at this time is represented as follows.

$$vq\cdot inv = -vq1 - vq2 \tag{16}$$

In step S307, voltage based on the voltage instruction of expression (16) is applied, and thereafter, in step S308, the current of the rotary machine 3 is made to be zero through the current circulation operation.

It is noted that only one of the application of constant DC voltage on d-axis in step S301 and the application of voltage based on the opposite voltage instruction (vq·inv) in step S307 may be performed.

FIG. 9 shows an example of an inductance measurement operation of the synchronous machine 3 according to embodiment 3. In FIG. 9, the upper diagram shows time change in the current flowing in the rotary machine 3, and the lower diagram shows time change in the voltage applied to the rotary machine 3.

After the inductance is measured by flowing the q-axis current, equal voltage in the opposite direction is applied so that current equal to the current flown upon the measurement of inductance flows in the opposite direction, whereby rotational torque applied to the rotor can be canceled and thus rotation of the rotor can be suppressed.

As described above, in the control device for rotary machine of embodiment 3, constant DC voltage is applied on d-axis to draw and stop the rotor of the rotary machine 3, and in addition, current equal to the q-axis current flown upon the inductance measurement for the rotary machine 3 is flown in the opposite direction on q-axis, whereby rotational torque applied to the rotor can be made to be zero. Thus, in addition to the effect of embodiment 2, an effect is obtained that rotation of the rotary machine 3 is further suppressed.

It is noted that, within the scope of the present invention relevant to a control device for rotary machine, the above embodiments may be freely combined with each other, or each of the above embodiments may be modified or abbreviated as appropriate.

Embodiment 4

Figure 10:
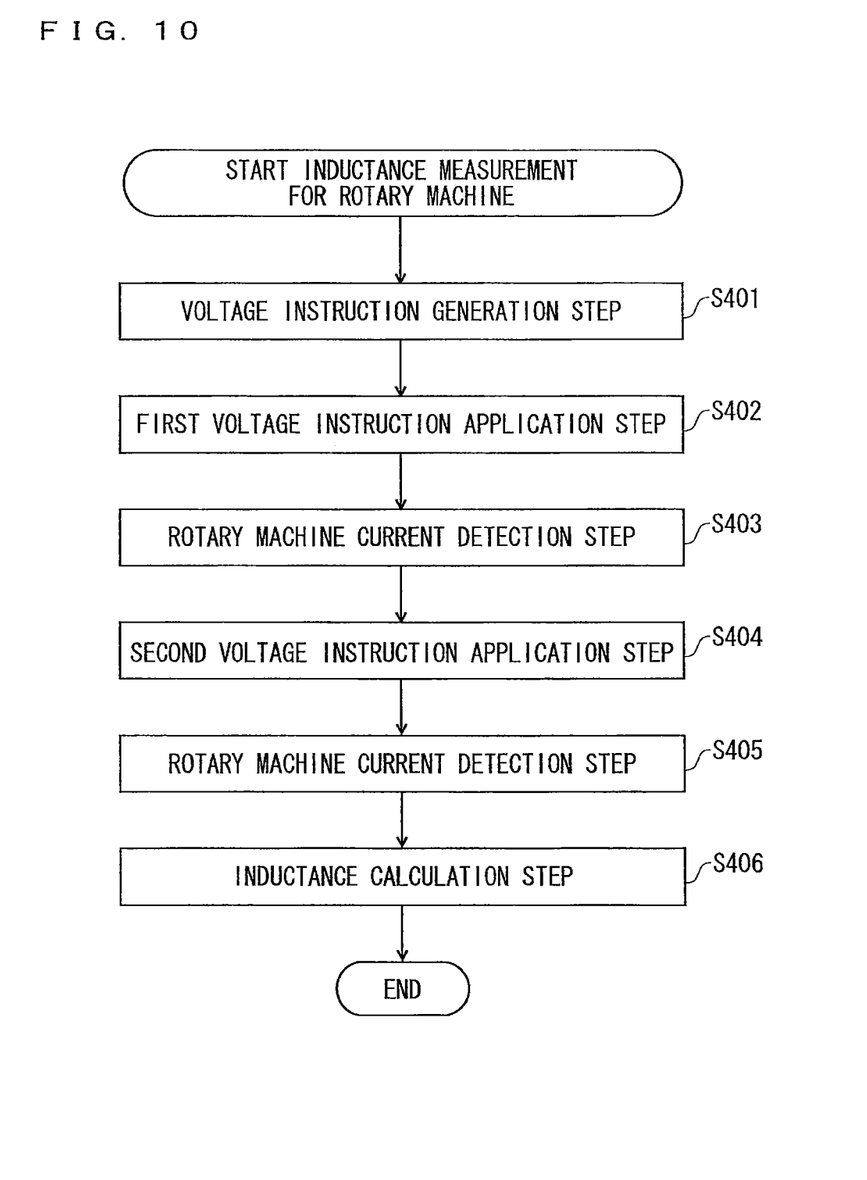
FIG. 10 is a flowchart according to an inductance measurement method for rotary machine of embodiment 4 of the present invention.

Hereinafter, embodiment 4 of the present invention will be described based on the drawings. FIG. 10 is a flowchart of an inductance measurement method for the rotary machine 3 according to embodiment 4 of the present invention.

In embodiment 4, the method for measuring the inductance of the rotary machine 3 in the case of application to the control device 2 for rotary machine of embodiment 1, will be described. However, the control device for rotary machine as application target is not limited thereto.

For example, in the control device 2 for rotary machine in FIG. 1 of embodiment 1, the configuration of the voltage application section 5, the inductance calculation section 6, and the voltage instruction generation section 7, excluding a part that can simplify the processing of software when configured as dedicated hardware, may be replaced with a calculator having an input-output circuit for voltage signal and current signal.

The inductance measurement method for the rotary machine 3 according to embodiment 4 of the present invention will be described based on FIG. 10.

The inductance measurement processing for the rotary machine 3 is performed by the following steps.

In step S401, the voltage instruction generation section 7 generates voltage instructions for inductance measurement preparation and measurement.

Next, in step S402, the voltage application section 5 applies, to the rotary machine 3, voltage based on a first voltage instruction for inductance measurement preparation generated by the voltage instruction generation section 7.

Next, in step S403, the current detection section 4 detects the current of the rotary machine 3, and the inductance calculation section 6 receives the detected value.

Next, in step S404, the voltage application section 5 applies, to the rotary machine 3, voltage based on a second voltage instruction for measurement generated by the voltage instruction generation section 7.

Next, in step S405, the current of the rotary machine 3 is detected as in step S404, and the inductance calculation section 6 receives the detected value.

Next, in step S406, the inductance calculation section 6 calculates the inductance of the rotary machine 3 based on the rotary machine currents detected in steps S403 and S405 and the voltage instructions from the voltage instruction generation section 7.

In embodiment 4, in FIG. 10, a basic method of the inductance measurement method for the rotary machine 3 has been described. That is, a method has been described in which, in order to measure the d-axis inductance at a predetermined rotary machine current value, two voltage instructions (voltage instructions for inductance measurement preparation and for measurement) are generated, voltages based on these voltage instructions are applied to the rotary machine 3, the rotary machine currents before and after the voltage application based on the voltage instruction for measurement are detected, and then the d-axis inductance is calculated.

A general inductance measurement method for rotary machine 3 corresponding to embodiment 1 can be composed of a step of the voltage instruction generation section 7 generating a plurality of voltage instructions of constant DC voltages, a step of the voltage application section 5 applying voltages based on the voltage instructions to the rotary machine 3, a step of the current detection section detecting rotary machine current, and a step of the inductance calculation section 6 calculating an inductance from a voltage instruction for measurement arbitrarily selected from the voltage instructions, and the rotary machine current detected by the current detection section 4 before and after application of the voltage instruction for measurement. By this inductance measurement method, a plurality of voltage instructions are generated and the inductances with respect to a plurality of rotary machine currents are measured in a series of processing steps, whereby the saturation characteristic can be obtained.

In addition, in accordance with embodiments 2 and 3, in order to measure the q-axis inductance, a step of performing current circulation operation for rotary machine current, a step of applying voltage based on a constant DC voltage instruction on d-axis, and a step of applying voltage based on a voltage instruction opposite to the voltage instruction for inductance measurement, may be added, whereby rotation of the rotor of the rotary machine 3 can be further suppressed.

As described above, in the inductance measurement method for rotary machine 3 of embodiment 4, two voltage instructions for inductance measurement preparation and for measurement are generated, voltages are applied to the rotary machine 3 based on these voltage instructions, the rotary machine currents before and after the voltage application based on the voltage instruction for measurement are detected, and then the inductance is calculated. Therefore, an inductance measurement method for rotary machine can be provided which does not need an A/D converter or a microcomputer with high performance for a control device to which the inductance measurement method is applied, can shorten a period during which current is flown to the rotary machine, can suppress vibration and noise of the rotary machine, and can measure the magnetic saturation characteristic of inductance.

It is noted that, within the scope of the present invention relevant to an inductance measurement method for rotary machine, the above embodiment may be modified or abbreviated as appropriate.

Industrial Applicability

The present invention relates to a control device and an inductance measurement method for measuring an electric constant of a rotary machine, and is applicable to a wide range of control devices for rotary machine.

The invention claimed is:

1. A control device for rotary machine, comprising:
a voltage instruction generation section for generating a voltage instruction;
a voltage application section for applying voltage to a rotary machine based on the voltage instruction;
a current detection section for detecting rotary machine current of the rotary machine; and
an inductance calculation section for calculating an inductance of the rotary machine from the voltage instruction and the rotary machine current, wherein
the voltage instruction generation section generates voltage instructions of constant DC voltages which are a first voltage instruction for inductance measurement preparation and a second voltage instruction for measurement,
the voltage application section sequentially applies voltages to the rotary machine based on the first and second voltage instructions, and
the inductance calculation section calculates the inductance from the voltage instruction for measurement arbitrarily selected from the voltage instructions, and the rotary machine currents detected by the current detection section before and after application of the voltage instruction for measurement.

2. The control device for rotary machine according to claim 1, wherein the inductance calculation section calculates the inductance, using winding resistance of the rotary machine.

3. The control device for rotary machine according to claim 1, wherein the voltage instruction generation section, after outputting the voltage instruction, outputs a voltage instruction having the same magnitude as the outputted voltage instruction in a direction opposite to the outputted voltage instruction to suppress occurrence of rotational torque of the rotary machine.

4. The control device for rotary machine according to claim 1, wherein the voltage instruction generation section superimposes, onto the voltage instruction, a voltage instruction of a constant DC voltage in a d-axis direction of the rotary machine.

5. The control device for rotary machine according to claim 1, wherein
the voltage application section applies voltage based on the voltage instruction generated by the voltage instruction generation section, in a d-axis direction or a q-axis direction of the rotary machine, and
the inductance calculation section calculates the inductance on d-axis or q-axis.

6. The control device for rotary machine according to claim 1, wherein
the voltage application section sequentially applies voltage based on the voltage instruction generated by the voltage instruction generation section, in a d-axis direction or a q-axis direction of the rotary machine, and
the inductance calculation section sequentially calculates the inductance on d-axis and the inductance on q-axis.

7. An inductance measurement method for rotary machine using a control device for rotary machine including: a voltage instruction generation section for generating a voltage instruction; a voltage application section for applying voltage to a rotary machine based on the voltage instruction; a current detection section for detecting rotary machine current of the rotary machine; and an inductance calculation section for calculating an inductance of the rotary machine from the voltage instruction and the rotary machine current, the inductance measurement method for rotary machine comprising:
a step of the voltage instruction generation section generating voltage instructions of constant DC voltages which are a first voltage instruction for inductance measurement preparation and a second voltage instruction for measurement;
a step of the voltage application section sequentially applying voltages to the rotary machine based on the first and second voltage instructions;
a step of the current detection section detecting the rotary machine current; and
a step of the inductance calculation section calculating the inductance from the voltage instruction for measurement arbitrarily selected from the voltage instructions, and the rotary machine currents detected by the current detection section before and after application of the voltage instruction for measurement.

8. The control device for rotary machine according to claim 2, wherein the voltage instruction generation section, after outputting the voltage instruction, outputs a voltage instruction having the same magnitude as the outputted voltage instruction in a direction opposite to the outputted voltage instruction to suppress occurrence of rotational torque of the rotary machine.

9. The control device for rotary machine according to claim 2, wherein the voltage instruction generation section superimposes, onto the voltage instruction, a voltage instruction of a constant DC voltage in a d-axis direction of the rotary machine.

10. The control device for rotary machine according to claim 2, wherein the voltage application section applies voltage based on the voltage instruction generated by the voltage instruction generation section, in a d-axis direction or a q-axis direction of the rotary machine, and
the inductance calculation section calculates the inductance on d-axis or q-axis.

11. The control device for rotary machine according to claim 2, wherein the voltage application section sequentially applies voltage based on the voltage instruction generated by the voltage instruction generation section, in a d-axis direction or a q-axis direction of the rotary machine, and
the inductance calculation section sequentially calculates the inductance on d-axis and the inductance on q-axis.

* * * * *